Figure 4:
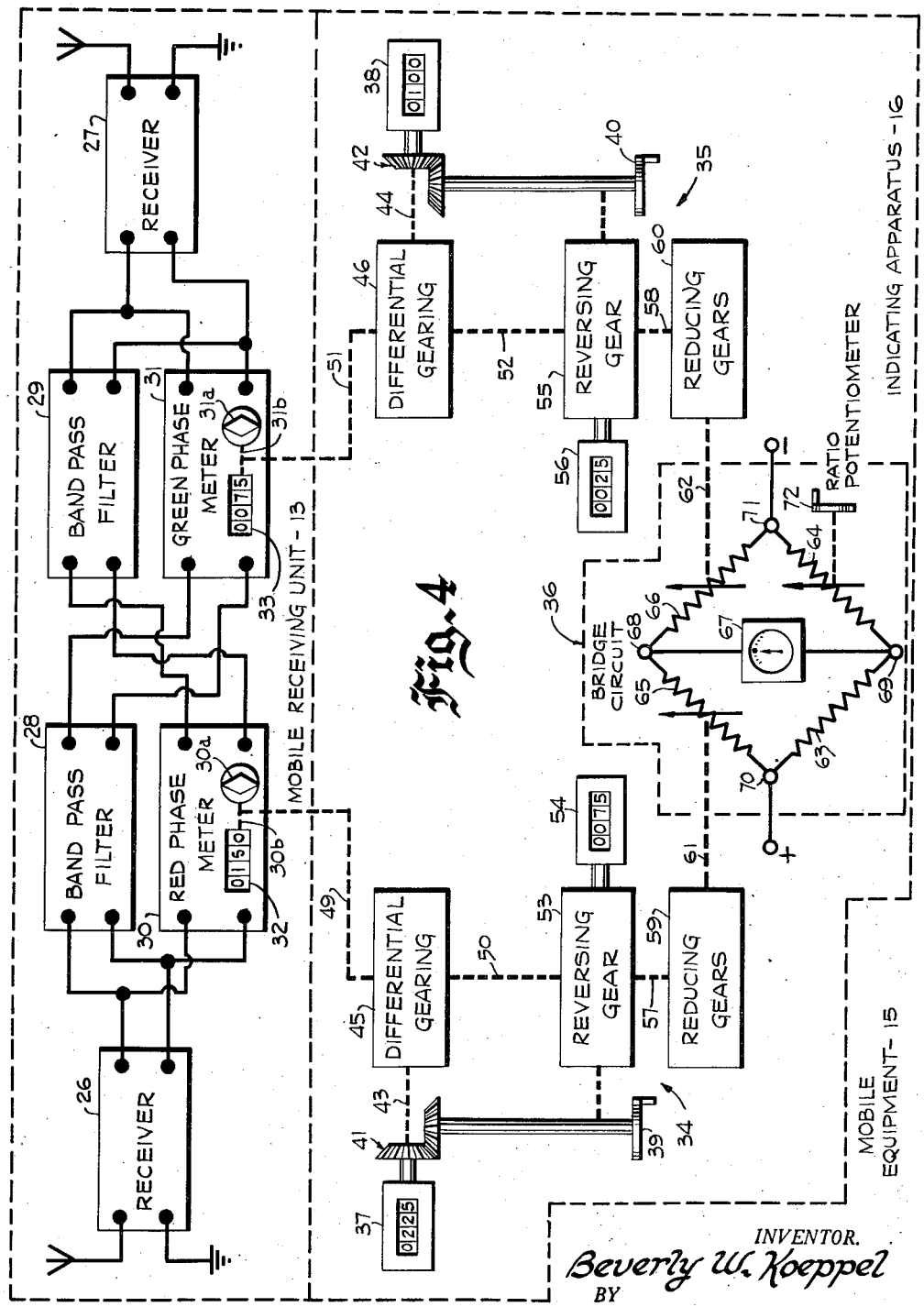

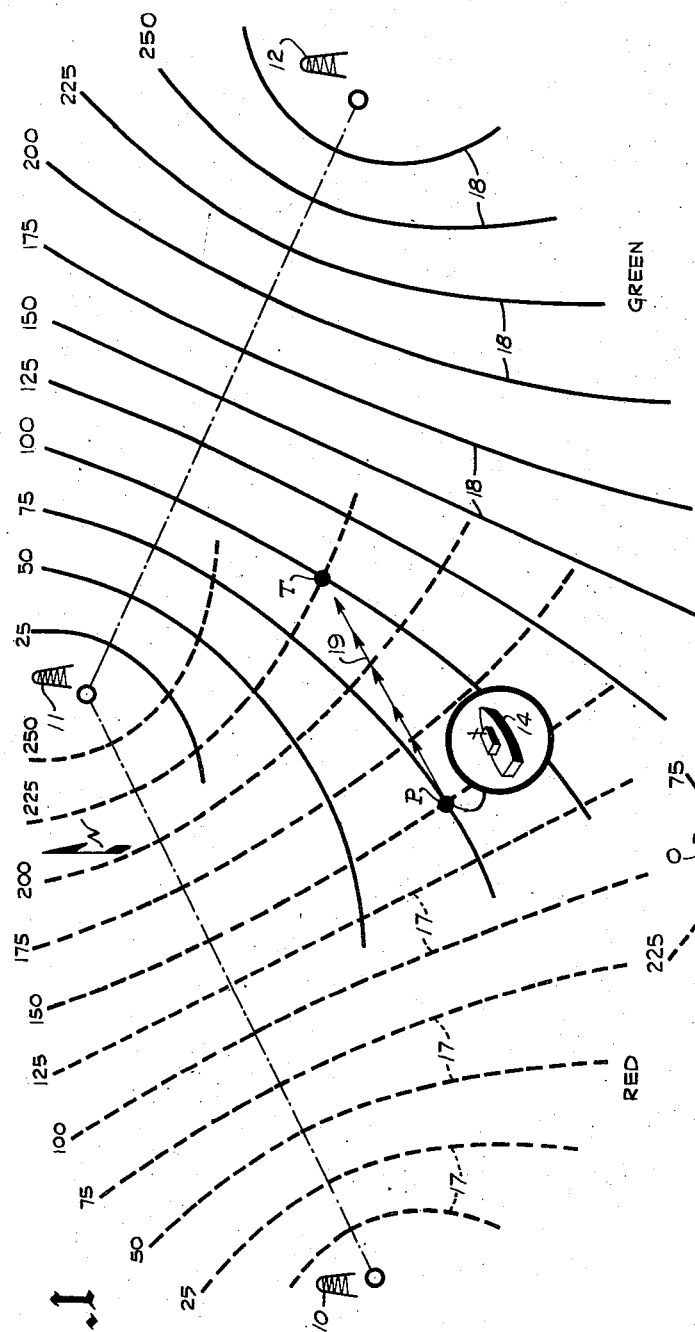
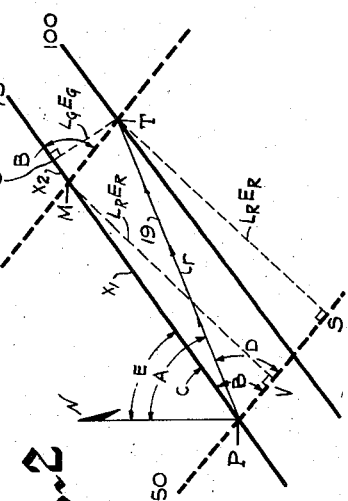
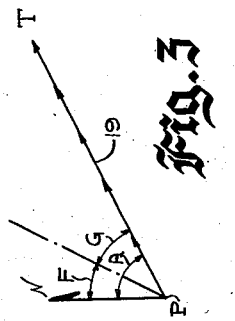

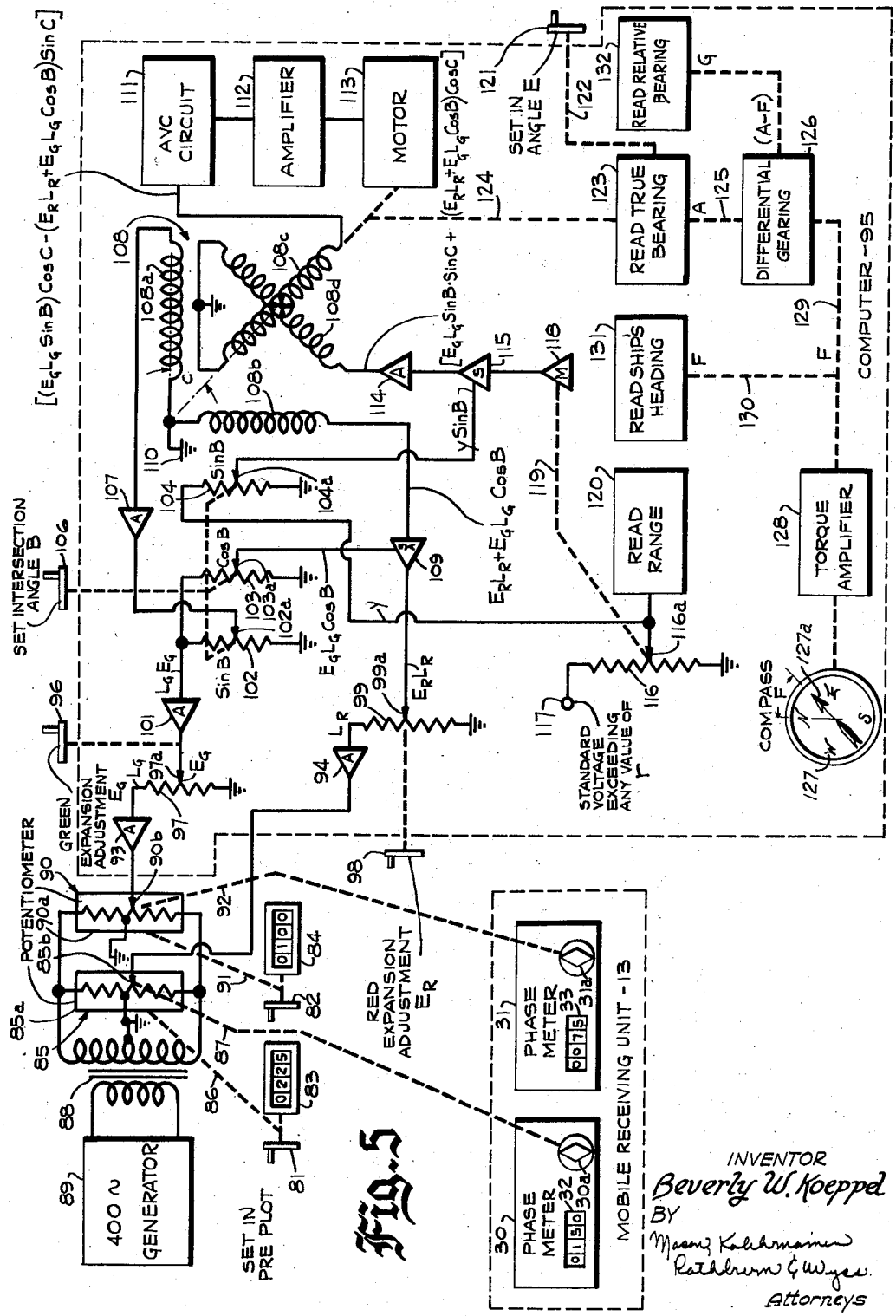

United States Patent Office 2,855,595
Patented Oct. 7, 1958

2,855,595

RADIO NAVIGATION SYSTEM

Beverly W. Koeppel, Tulsa, Okla., assignor to Seismograph Service Corporation, Tulsa, Okla., a corporation of Delaware Application May 26, 1955, Serial No. 511,340

23 Claims. (Cl. 343—105)

This invention relates generally to a new and improved radio navigation system and more particularly to apparatus operating in conjunction with radio position finding equipment to facilitate navigation of a mobile craft to any predetermined position.

Radio position finding systems of the type employing phase comparison in pairs of position indicating signals radiated from a plurality of spaced transmitting stations have been developed to the point where the position of a mobile receiving point relative to the known locations of the transmitting stations may be determined with a high degree of accuracy. In systems of this particular type, at least two indicating means, including phase comparison devices, are generally employed to provide indications representative of hyperbolic isophase lines having foci at different pairs of the transmitting stations and each passing through the location of the receiving point. Each of these indicating means customarily includes counters or other mechanism for measuring the number of complete revolutions of its phase comparison device in order to determine the number of lanes traversed by the mobile craft as it moves relative to the transmitting stations. In order to obtain a position fix accurately determinative of the location of the mobile craft, the navigator or pilot generally plots the readings of the indicating means on a chart of the area in which the mobile craft is operating, which chart is covered with a grid-like pattern of hyperbolic lines or coordinates representative of the different isophase positions occupied by the craft.

One of the principal problems confronting the navigator is that of determining the most expeditious manner of guiding the craft from the position defined by the indicating means, which will hereinafter be referred to as the "present craft position," to any desired target point. In moving the craft from one position to another, it is, of course, desirable to follow a direct or straight line in order to effect a saving in the time required to reach the desired destination and also to economize upon the fuel consumed by the craft in traversing the distance between the two positions. At the present time, the craft is generally guided by first determining the hyperbolic coordinates of the target point, next visualizing the difference in lane readings between the hyperbolic coordinates of the present position and those of the target position, and then mentally computing the desired rate of change of each of the indicating means as the craft approaches the target point. Obviously, such a procedure is laborious and time consuming and, in addition, is extremely inaccurate. Specifically, since the speed of the craft, the force and direction of the wind, and the magnitude and direction of the waves and currents when operating upon water all vary to a considerable extent during the movement of the craft to the target point it is exceedingly difficult to obtain accurate results by relying solely upon the skill of the operator in interpreting the readings of the indicating means. Furthermore, due to the movement of the craft and the resulting changes in the indicator readings, the "present position" determinations after translation into chart coordinates are not current, but instead, exhibit circumstances that existed at the time the indicator readings were made, thus requiring an extrapolation of the data derived from the chart in order to estimate the current conditions.

It would, therefore, be desirable to provide apparatus for continuously and automatically indicating the progress of the mobile craft as it approaches the target point. There have been a few prior art arrangements for providing such an indication but these have generally been susceptible to objection in that they have failed to take into account the many changing conditions encountered in different areas of operation within the hyperbolic field pattern of the position finding system. Thus, these prior art arrangements have resulted in the production of information lacking the accuracy necessary for successful use in a continuous wave system. Moreover, the information provided by many of these prior art devices has been presented in such manner that it is difficult to interpret with the result that only highly trained, skilled technicians are capable of operating the equipment.

Accordingly, it is an object of the present invention to provide new and improved apparatus for providing continuous data concerning the progress of a mobile craft when moving toward a predetermined target point.

Another object of the present invention is to provide an apparatus of the character described above for use in conjunction with radio position finding systems of the hyperbolic type.

It is a further object of the present invention to provide apparatus for continuously indicating the range and bearing of a mobile craft from a predetermined target position.

Still another object of the present invention is to provide apparatus for use in radio position finding systems of the hyperbolic type to assist in navigation of a mobile craft by indicating the amount and direction of deviation of the craft from a direct course to a predetermined target point.

It is likewise an object of the present invention to provide apparatus for use in radio position finding systems of the hyperbolic continuous wave type which apparatus is responsive to radio signals corresponding to the geographical position of a mobile craft and to signals corresponding to a selected future position in order to provide continuous data indicative of the progress of the craft as it approaches the future position.

A further object of the invention is to provide an apparatus of the character set forth in the preceding paragraph wherein the data is presented in a form which may be readily and accurately interpreted by relatively unskilled operators.

A still further object of the invention is to provide apparatus for use in conjunction with radio position finding systems of the hyperbolic continuous wave type in order continuously to indicate with a high degree of accuracy the range and bearing of a mobile craft to any selected future position.

The invention both as to its organization and method of operation together with further objects and advantages thereof will best be understood by reference to the specification taken in conjunction with the accompanying drawings in which:

Fig. 1 is a diagrammatic representation of a three foci position indicating system together with the grid-like pattern of hyperbolic isophase lines associated therewith, and illustrates the desired course to be pursued by a mobile craft in moving between two spaced points in the pattern;

Fig. 2 diagrammatically illustrates the relationship between the course of the mobile craft and the hyperbolic isophase lines traversed thereby during its movement;

Fig. 3 diagrammatically illustrates the relative angular relationships between magnetic north, the heading of the mobile craft and the bearing of the target position with respect to the mobile craft;

Fig. 4 diagrammatically illustrates apparatus characterized by the features of the present invention for indicating the amount and direction of deviation of the mobile craft from the desired course to the target position; and Fig. 5 is a diagrammatic representation of an alternative construction of the apparatus of the present invention which is adapted continuously to indicate the range and bearing of the target position relative to the mobile craft.

Referring now to the drawings, and more particularly to Fig. 1 thereof, there is illustrated a three foci hyperbolic system, preferably of the continuous wave type, for providing position information at mobile equipment 15 (Fig. 4) which may be carried by any number of crafts or vehicles 14 operated within the radius of transmission of a plurality of spaced transmitters or transmitting units 10, 11 and 12. The transmitting portion of the system may be of any well known type for radiating position indicating signals to the mobile craft where they may be phase compared in pairs in order to provide indications of the location of the mobile craft relative to the transmitting stations 10, 11 and 12. Specifically, the transmitting portion of the system may be identical to the transmitting equipment claimed and described in Patent No. 2,513,317, granted to James E. Hawkins and Robert S. Finn, on July 4, 1950 and assigned to the same assignee as the present invention. As a matter of fact, the equipment respectively provided at the transmitting stations 10, 11 and 12 illustrated in Fig. 1 may be identical to that employed at the transmitting units bearing the same reference numerals in the above-identified Hawkins and Finn patent. It should be understood, however, that other transmitting systems may be employed operating upon the heterodyne principle as disclosed in Patent No. 2,148,267 to E. A. H. Honore, granted February 21, 1939 or, for that matter, a synchronized transmitting system could be used.

In any event, the waves radiated from the transmitters 10, 11 and 12 are received at the mobile equipment 15 and the phase relationship between the waves received from transmitters 10 and 11 is determined in order to provided an indication of the location of the mobile craft 14 relative to adjacent isophase lines of a family of hyperbolas having foci at the transmitters 10 and 11. These hyperbolas are represented by the broken lines 17 in Fig. 1 and, for convenience, are hereinafter referred to as Red hyperbolas. In similar manner, the phase relationship between the signals received from transmitters 11 and 12 is determined in order to provide an indication of the location of the mobile craft relative to adjacent isophase lines of a family of hyperbolas having foci at the transmitters 11 and 12. The latter hyperbolas are represented by the solid lines 18 shown in Fig. 1 and are hereinafter referred to as Green hyperbolas.

Specifically, referring to Fig. 4 of the drawings, the mobile equipment 15 comprises a mobile receiving unit 13 for providing the position indications described above together with indicating apparatus 16 for continuously indicating the progress of the mobile craft as it approaches a predetermined target position in a manner described in detail hereinafter. The mobile receiving unit 13 is identical to that shown in the above identified patent to Hawkins and Finn, and includes receivers 26 and 27, band pass filters 28 and 29, and phase meters 30 and 31 all functioning in the manner described in the patent to provide position indications upon the phase meters 30 and 31 accurately representative of the location of the mobile craft 14. It should be understood that the mobile receiving unit shown in Fig. 4 is merely illustrative of a particular apparatus which can be employed in the system of the present invention, since any receiving apparatus providing the required hyperbolic position indications may be used. The phase meter 30, as indicated above, provides an indication representative of the location of the mobile craft along one of the hyperbolic lines of the Red family while the phase meter 31 provides an indication of the location of the mobile craft along one of the hyperbolic lines of the Green family. Thus, the phase comparisons effected by the phase meters 30 and 31 identify a pair of intersecting isophase lines passing through the location of mobile craft 14. These phase meter indications may be used in conjunction with a chart containing a hyperbolic grid representative of the isophase lines in order to transform the phase measurements into a geographical position fix. Such a chart may be somewhat similar in appearance to that shown in Fig. 1 although, in order to facilitate the illustration, the latter depicts only a representative few of the hyperbolic lines actually shown on the chart.

The measurements provided by the phase meters 30 and 31 are ambiguous in the sense that they do not identify the particular hyperbolic lines upon which the mobile craft is located. To resolve this ambiguity, the phase meters 30 and 31 may respectively include rotatable indicating elements 30a and 31a mechanically coupled, as indicated by the broken lines 30b and 31b, to integral counters 32 and 33, respectively, which function to count each 360 degree revolution of the rotatable indicating elements and, hence, identify the number of lanes traversed by the craft 14, a lane being defined as the distance between adjacent isophase lines. In order to correlate the indications on the phase meters and their associated counters with the isophase lines appearing on the chart, the craft 14 may initially enter the radiation field of the transmitters 10, 11 and 12 at a known geographical location at which time the rotatable indicating elements 30a and 31a and the counters 32 and 33 may be manually indexed to correspond to the known location.

From the foregoing explanation, it will be recognized that the counters 32 and 33 identify the lanes within which the craft 14 is located while the phase meters 30 and 31 accurately define the position of the craft within the identified lanes. This position is indicated as P in Fig. 1 and, for the purpose of illustration, is shown as being located at the intersection of hyperbola number 150 of the Red family and hyperbola number 75 of the Green family, the numbers being assigned merely to facilitate identification of the different hyperbolic lines. The invention will perhaps be best understood by considering the solution of a specific navigation problem and by describing the mode of operation of the apparatus involved in effecting such a solution. Thus, as illustrated in Fig. 1, it is desired to navigate the craft 14 from the point P to that labeled T which may be termed the preplot or target point and which is defined by the intersection of hyperbola number 225 of the Red family and by hyperbola number 100 of the Green family. In order to conserve fuel and to reach the desired destination in a minimum amount of time, it is, of course, desirable that the craft follow a straight line represented by the arrow pointed line 19.

In order for the mobile craft to reach the target point, the rotatable element 30a of the phase meter 30 reading the Red hyperbolas must make seventy-five complete revolutions in the proper direction to increase the reading on the counter 32 from 150 to 225 while at the same time the rotating element 31a must make twenty-five complete revolutions in a proper direction to increase the reading on counter 33 from 75 to 100. As a consequence, the craft 14 must be guided in such direction that the rate of change of the indications appearing on phase meter 30 and counter 32 is approximately three times the rate of change of the indications appearing on phase meter 31 and counter 33. Heretofore, navigation of the craft 14 has generally been effected by mentally computing these desired rates of changes and directing the craft accordingly, a procedure which is at best only a rough approximation.

In accordance with the present invention, navigation of the craft 14 in approximately a straight line path to the target point, is facilitated by cooperation between the indicating apparatus 16 and the mobile receiving unit 13 described above. To this end, as shown in Fig. 4, the indicating apparatus 16 comprises a mechanism indicated generally as 34 for producing an output corresponding to the difference in Red hyperbolic lanes from the position of the craft to the target point, a mechanism indicated generally as 35 for producing an output corresponding to the difference in Green hyperbolic lanes from the position of the craft to the point T, and an indicator designated as 36 jointly responsive to the outputs of the mechanisms 34 and 35 for indicating the direction and amount of deviation of the craft 14 from the desired straight line course. Specifically, the mechanisms 34 and 35 include manually settable preplot counters 37 and 38 respectively indicative of the hyperbolic lines or coordinates of the Red and Green families passing through the preplot point T. In order to facilitate adjustment of the preplot counters 37 and 38 to any desired setting, the latter are respectively coupled through suitable gearing such as bevel gears 41 and 42 to manually operable cranks or handwheels 39 and 40. The preplot counters 37 and 38 are also respectively connected, as indicated by broken lines 43 and 44, to drive one of the input gears of mechanical differentials 45 and 46. The other input gear of the differential 45 is driven by the rotatable element 30a of the Red phase meter 30 through mechanical coupling indicated by broken line 49 with the result that the output shaft of the differential, represented by the broken line 50, is driven in correlation with the rate of change of the indications appearing on phase meter 30 and counter 32 as the craft approaches the target point. In similar manner, the second input gear of the differential 46 is connected, as indicated by broken line 51, to be driven by the rotatable element 31a of the Green phase meter 31. As a consequence, output shaft 52 of the differential 46 is driven at a rate correlated with the rate of change of the indications appearing on the phase meter 31 and on the counter 33.

In order to indicate the difference in reading between the lane counter 32 and the preplot counter 37, the output shaft 50 and the handwheel 39 are connected through a reversing gear 53 to a difference counter 54. The reversing gear functions to provide a positive reading on the difference counter 54 irrespective of the relative readings on the preplot counter 37 and on the lane counter 32. Thus, the difference counter 54 will continuously indicate the difference between the preplot counter 37 and the lane counter 32 and, hence, provides a continuous measurement of the number of Red lanes that must be traversed before the craft 14 arrives at its destination.

In similar manner, the output shaft 52 and the handwheel 40 for setting the Green preplot counter 38 are connected through a reversing gear 55 to drive a Green difference counter 56. The reversing gear 55 functions to provide a unidirectional drive for the counter 56 regardless of whether the setting of the preplot counter 38 is greater or less than the indication on the lane counter 33. Thus, the difference counter 56 continuously measures the difference in readings between the preplot counter 38 and the lane counter 33 and, hence, provides a continuous measurement of the number of Green lanes that must be traversed by the mobile craft before it will reach the Green hyperbolic isophase line passing through the preplot point T.

In order to provide a continuous indication of the progress of the mobile craft as it approaches the preplot point, the outputs of the reversing gears 53 and 55 appearing upon drive connections 57 and 58, respectively, are reduced in speed by conventional speed reduction gears 59 and 60 and are then employed to actuate drive shafts 61 and 62 for the indicator 36. The indicator 36 comprises a Wheatstone bridge circuit which includes as its four arms a fixed resistor 63, a manually settable ratio potentiometer 64, a Red displacement potentiometer 65 driven by the shaft 61 and a Green displacement potentiometer 66 driven by the shaft 62. To provide a measurement of the balance or unbalance of the bridge circuit, a suitable measuring device such as a galvanometer 67 is connected across output terminals or null points 68 and 69. As is customary in bridge circuits of the type illustrated, a suitable source of energizing potential is connected across input terminals 70 and 71.

As indicated above, the output of the mechanism 34 appearing upon drive shaft 61 drives the displacement potentiometer 65 at a rate which is a function of the rate of change of the indications appearing upon the Red phase meter 30 and the Red lane counter 32. Similarly, the output of the mechanism 35 appearing upon shaft 62 drives the displacement potentiometer 66 at a rate which is a function of the rate of change of the indications on the Green phase meter 31 and the Green lane counter 33.

If it is assumed that the expansion rates of the Red and Green lanes are uniform in the area between points P and T and, that the angle of intersection of the Red and Green hyperbolas is constant in this area, conditions which will exist to a fair degree of accuracy if the points P and T are not spaced excessively far apart, it is desirable to guide the craft so that a constant ratio is maintained between the rate of change of the resistance of Red displacement potentiometer 65 and the rate of change of the resistance of Green displacement potentiometer 66. In other words, under the assumptions outlined above, it is desirable to navigate the craft in such manner that the rate of traversing the Red lanes bears a fixed ratio to the rate of traversing the Green lanes. The magnitude of this fixed ratio is determined by the readings of the difference counters 54 and 56 when the craft is located at position P and, for the problem illustrated in Fig. 1, this ratio is 3 to 1. Accordingly, if the craft is to follow the desired course a 3 to 1 ratio of the readings on the difference counters 54 and 56 should constantly be maintained.

To permit the bridge circuit of the indicator 36 to indicate any deviation of the ratio between the readings on difference counters 54 and 56 from the predetermined fixed ratio, the potentiometer 64 is adjusted by a manually operable handwheel or crank 72 until its resistance is related to that of the fixed resistor 63 by a ratio corresponding to the predetermined fixed ratio. Thus, in the problem illustrated in Fig. 1, with the craft at position P the potentiometer 64 is adjusted until its resistance is equal to one-third that of the fixed resistor 63. A suitable calibration scale may be provided in proximity to the crank 72 in order to indicate the ratio set into the bridge circuit by potentiometer 64, although such a scale has not been shown in Fig. 4.

After the potentiometer 64 has been properly adjusted in the manner just described, the craft 14 is moved from the point P in the direction of the target point T with the result that the indications appearing upon the phase meters 30 and 31 and upon the lane counters 32 and 33 will change. These changes will be reflected in the indications provided by the difference counters 54 and 56 in the manner described above, and, in addition, will induce the shafts 61 and 62 to drive the displacement potentiometers 65 and 66 at a rate corresponding to the changes in the difference counter readings. However, as long as the indication appearing on difference counter 54 is three times that appearing on difference counter 56, the ratio of the resistances of potentiometers 65 and 66 will remain 3 to 1, and the bridge circuit will be balanced. The balanced bridge condition is, of course, indicated by a null or zero reading on the galvanometer 67 and is also indicative of the fact that the craft is on course.

If the ratio between difference counters 54 and 56 should deviate from the desired 3 to 1 ratio, the potentiometers 65 and 66 will be so driven as to unbalance the bridge by an amount which is a function of the degree of deviation and in a direction which is a function of whether the craft is to the left or right of its desired course. The described unbalance of the bridge will appear upon the galvanometer 67 to indicate to the navigator an approximation of the amount and direction that the craft is off course. Obviously, the navigator can take the necessary steps to direct the craft back to its proper course at which time the bridge will again become balanced. As the craft approaches the target point the readings of the difference counters 54 and 56 are gradually reduced until the craft reaches its destination at which time the difference counters will both read zero.

To review briefly the operation of the navigation equipment described above, it will be evident from the foregoing description that an indication of the present craft position is first obtained by reference to the phase meters 30 and 31 and the lane counters 32 and 33 and to the hyperbolic chart of the area in which the craft is operating. The hyperbolic coordinates corresponding to the desired destination point are then obtained from the chart and are set into the preplot counters 37 and 38 by manually rotating the cranks 39 and 40. The absolute difference between the readings of lane counter 32 and preplot counter 37 is portrayed by the difference counter 54, while the difference counter 56 measures the absolute difference between the readings of lane counter 33 and preplot counter 38. While the craft is at initial position P ratio potentiometer 64 is adjusted in accordance with the ratio between the readings of the two difference counters 54 and 56 to establish the proper bridge conditions. When the craft 14 is navigated towards the preplot point T, the phase meters 30 and 31 in cooperation with lane counters 32 and 33 provide continuous identification of the craft position. At the same time, the readings of the difference counters 54 and 56 respectively indicate the number of Red and Green lanes between the present position and the preplot point. The bridge circuit of the indicator 36 continually compares the fixed ratio established by the setting of the ratio potentiometer 64 with the "present" ratio determined by the readings of the Red and Green difference counters 54 and 56. As long as the "present" ratio remains equal to the fixed ratio, the galvanometer 67 will provide a null or on course reading. However, when the craft veers from the desired course, the "present" ratio deviates from the fixed ratio and the bridge is unbalanced to provide an indication on the meter 67 of the direction and amount of correction necessary to bring the craft back on course.

From the foregoing description, it will be apparent that the apparatus shown in Fig. 4 is particularly well suited for the solution of navigation problems where the distance to the target point is not too great. Thus, this apparatus is quite useful in conducting a geophysical survey of an area where it is desired to detonate explosives from a series of shot points spaced relatively close together along one or more specified lines. In such operations, the shot points are transferred into hyperbolic position coordinates by reference to the geographical chart. The mobile craft is then navigated along a direct line from shot point to shot point in the desired sequence by use of the apparatus shown in Fig. 4 in the manner described above.

In some instances it may be desirable to provide apparatus furnishing more detailed information as to the relationship between the craft position and the target point such, for example, as continuous indications of the range and bearing of the target point from the craft. Apparatus for effecting this result is illustrated in Fig. 5 wherein there is provided a mobile receiving unit 13 of the type illustrated in detail in Fig. 4 and including phase meters 30 and 31 for providing hyperbolic position indications in the manner described above. Thus, as previously mentioned, the indication appearing on phase meter 30 taken with the lane counter 32 identifies the location of the craft 14 along one of the hyperbolic lines 17 of the Red family and the indication appearing on phase meter 31 taken with the lane counter 33 identifies the hyperbolic line of the Green family passing through the craft location.

In the ensuing description of the mode of operation of the apparatus shown in Fig. 5, it will again be assumed that it is desired to navigate the craft 14 from the initial position P in Fig. 1 to the target or preplot position T. To this end, the hyperbolic coordinates passing through the preplot point may be determined by reference to the geographical chart described above after which hand cranks 81 and 82 may be manually rotated to drive preplot counters 83 and 84 until they correspond to the coordinates of the Red and Green families passing through the preplot position. In order to provide an electrical signal indicative of the difference between the Red phase meter 30 and its associated lane counter 32 and the Red preplot counter 83, the hand crank 81 and the rotatable element 30a of the phase meter 30 are connected differentially to drive a Red displacement potentiometer 85. Specifically, as indicated by the broken line 86, the hand crank 81 may be connected to rotate a potentiometer casing or support 85a carrying the slide wire of the potentiometer 85 while the rotatable indicating element 30a may be connected to drive the variable tap 85b as indicated by broken line 87.

To provide excitation signals for the potentiometer 85, its slide wire is connected cross the center tapped secondary winding of a transformer 88, the primary winding of which is energized by a suitable source of alternating current signals of any desired frequency as, for example, by 400 cycle signal generator 89. Since the center tap of the secondary winding of transformer 88 is connected to ground, the amplitude of the voltage appearing between the variable tap 85b of potentiometer 85 and ground varies as a function of the difference between the phase meter 30 and lane counter 32 and the preplot counter 83 while the phase of this voltage is determined by the direction of the difference. Specifically, if the reading of preplot counter 83 exceeds that of lane counter 32, the phase of the signal appearing between variable tap 85b and ground is 180 degrees reversed from the phase of the signal appearing therebetween when the reading of the preplot counter 83 is less than that of the lane counter 32. The appearance of zero potential between the variable tap 85b and ground is, of course, indicative of the fact that the readings on lane counter 32 and on the preplot counter 83 coincide.

In similar manner, the hand crank 82, as indicated by broken line 91, is connected to rotate the casing or support 90a for the slide wire of Green displacement potentiometer 90. The variable tap 90b of the potentiometer 90 is driven in accordance with the rotation of the rotatable element 31a of the phase meter 31 as indicated by broken line 92. Since the slide wire of potentiometer 90 is connected in parallel with that of potentiometer 85, the amplitude of the voltage appearing between the variable tap 90b and ground varies as a function of the difference between the Green preplot counter 84 and the lane counter 33. As before, when the variable tap 90b is centered with respect to the slide wire of potentiometer 90, no voltage appears between tap 90b and ground and the reading on lane counter 33 and on the preplot counter 84 coincide. Again, the phase of the signal appearing between variable tap 90b and ground when the reading of preplot counter 84 is greater than that of lane counter 33 is reversed from the phase of the signal appearing between these same two points when the reading of the lane counter 33 exceeds that of the preplot counter 84.

In summary, the amplitude of the output signal of potentiometer 85 is constantly proportional to the number of Red lanes which must be traversed by the mobile craft to reach the preplot point T while the phase of this signal is a function of the direction in which the lane counter 32 must be rotated to establish coincidence with the preplot counter 83. Similarly, the amplitude of the output signal from potentiometer 90 is constantly proportional to the number of Green lanes that must be traversed by the craft in reaching point T and the phase of this signal is dependent upon the relative magnitudes of the readings on counters 33 and 84. The output signals of the potentiometers 85 and 90 are supplied through suitable amplifiers 93 and 94 to a computer indicated generally as 95 which functions, in a manner to be described hereinafter, to provide continuous indications of the range and bearing of the point T from the craft.

Before continuing with the description of the computer 95, the explanation will perhaps be enhanced by further consideration of the problem to be solved. Thus, referring particularly to Fig. 2 of the drawings, it will be observed that the area between the points P and T is there illustrated, the point P being defined by intersecting hyperbolic coordinates 150 and 75 of the Red and Green families, and the point T being defined by intersecting hyperbolic coordinates 225 and 100 of the Red and Green families. The desired course of the craft is indicated by the straight line 19 and is disposed at an angle A with respect to magnetic north represented by the arrow pointed line N. If it is assumed that the hyperbolic lines of the Red family numbered 150 and 225 are parallel to each other and that the hyperbolic lines of the Green family numbered 75 and 100 are parallel to each other and further that all of these lines are substantially straight lines throughout the area of interest, conditions which will be approximated if the points P and T are not spaced excessively far apart or fall within areas where the hyperbolic lines are uniformly spaced, then the difference between the reading of preplot counter 83 and that appearing on phase meter 30 and its associated lane counter 32 is represented by the quantity $L_R$ and the difference between the reading of preplot counter 84 and that appearing on phase meter 31 and its associated lane counter 33 is represented by the quantity $L_G$. It will be recalled that electrical signals continuously corresponding to the values $L_R$ and $L_G$ are supplied by the potentiometers 85 and 90 of the indicating apparatus shown in Fig. 5 and, hence, these signals may be regarded as input signals continuously supplied to the computer 95.

In accordance with an important feature of the present invention, the computer is also supplied with information concerning the expansion rates of both the Red and Green hyperbolas in the area under investigation together with information relative to the angle of intersection B of the hyperbolas within that area. In the apparatus shown in Fig. 5, the values of the expansion rates and the angle of intersection B are derived from the chart of the area and are manually set into the computer in a manner to be described hereinafter. It is the function of the computer 95 to respond to the input signals $L_R$ and $L_G$ and to the data concerning expansion rates and angle of intersection by indicating the range $r$ of the preplot point T from the craft. The computer 95 is also supplied with information concerning the orientation of the hyperbolic lines with respect to magnetic north in the area in which the craft 14 is operating, thereby to enable the computer to indicate the bearing A of the preplot point with respect to magnetic north and/or the relative bearing of the preplot point from the course or heading of the mobile craft. The mathematical computations required of the computer 95 to effect these results will now be set forth.

Thus, it will be apparent from the triangle PMV shown in Fig. 2 that:

$$X_1 = \frac{L_R E_R}{\sin B} \tag{1}$$

where $L_R E_R$ represents the perpendicular distance from target point T to the hyperbolic coordinate 150 passing through the point P, $E_R$ represents the expansion rate of the Red family of hyperbolas in the area under consideration, and $L_R$, as indicated above, represents the number of Red lanes which must be traversed by the mobile craft to reach the target point. As previously mentioned, a signal corresponding to $L_R$ is obtained from the potentiometer 85 and the term $E_R$ is set into the computer by means of a manually operable crank 98 which varies variable tap $99a$ of a potentiometer 99 in such manner that the voltage appearing between the variable tap and ground corresponds to $L_R E_R$.

Similarly, from triangle TOM:

$$X_2 = \frac{L_G E_G}{\tan B} = \frac{L_G E_G \cos B}{\sin B} \tag{2}$$

where $L_G E_G$ represents the perpendicular distance between the target point T and hyperbolic line 75, $E_G$ represents the expansion rate of the Green family of hyperbolas in the area in which the mobile craft is operating, and $L_G$ represents the number of Green lanes which must be traversed by the mobile craft to reach the point T. As indicated above, a signal corresponding to $L_G$ appears at the output of potentiometer 90 and the value of $E_G$ is manually supplied to the computer 95 by handcrank 96 which varies the position of tap $97a$ along the slide wire of a potentiometer 97 in order to produce a signal corresponding to the quantity $E_G L_G$ between tap $97a$ and ground.

From Equations 1 and 2

$$X_1 + X_2 = \frac{L_R E_R}{\sin B} + \frac{L_G E_G \cos B}{\sin B} \tag{3}$$

From triangle POT and Equation 3:

$$r = \sqrt{(L_G E_G)^2 + \frac{(L_R E_R + L_G E_G \cos B)^2}{\sin^2 B}}$$

which reduces to:

$$r = \frac{1}{\sin B}\sqrt{L_G^2 E_G^2 \sin^2 B + (L_R E_R + L_G E_G \cos B)^2} \tag{4}$$

Equation 4 may be rewritten by setting:

$$u = E_R L_R + L_G E_G \cos B \tag{5}$$

and $$v = L_G E_G \sin B \tag{6}$$

so that $$r = k\sqrt{u^2 + v^2}$$

where $$k = \frac{1}{\sin B} \tag{7}$$

Now, assume an arbitrary angle $C'$ of such value that:

$$\tan C' = \frac{v}{u} = \frac{L_G E_G \sin B}{E_R L_R + L_G E_G \cos B} \tag{8}$$

or $$\frac{\sin C'}{\cos C'} = \frac{v}{u} \tag{9}$$

$$u \sin C' - v \cos C' = 0 \tag{10}$$

However, from triangle POT and from Equation 3:

$$\tan C = \frac{L_G E_G}{X_1 + X_2} \text{ equals } \frac{L_G E_G \sin B}{L_R E_R + L_G E_G \cos B} \tag{11}$$

Hence, a comparison of Equations 8 and 11 reveals that $C'$ and $C$ are the same angle.

From Equation 7:

$$r^2 = k^2 (u^2 + v^2) \tag{12}$$

From Equation 9:

$$v^2 = \frac{u^2 \sin^2 C}{\cos^2 C} \quad (13)$$

Combining Equations 12 and 13 and factoring:

$$r^2 = k^2 u^2 = \frac{(\cos^2 C + \sin^2 C)}{\cos^2 C}$$

or $$r^2 = \frac{k^2 u^2}{\cos^2 C}$$

$$r = \frac{ku}{\cos C} \text{ or } ku = r \cos C \quad (14)$$

Similarly it can be shown that:

$$r = \frac{kv}{\sin C} \text{ or } kv = r \sin C \quad (15)$$

Substituting Equations 14 and 15 into Equation 12:

$$r^2 = ku (r \cos C) + kv (r \sin C) \quad (16)$$

From which:

$$r = (u \cos C + v \sin C) k \quad (17)$$

Substituting the values of $u$ and $v$ from Equations 5 and 6 yields:

$$r = \frac{1}{\sin B}[(L_R E_R + E_G L_G \cos B) \cos C + (L_G E_G \sin B) \sin C] \quad (18)$$

Equation 10 yields:

$$0 = L_G E_G \sin B \cos C - L_R E_R \sin C - L_G E_G \cos B \sin C \quad (19)$$

Equations 18 and 19 are a pair of simultaneous equations with two unknowns, i. e., $r$ and $C$, and, accordingly, may readily be solved by analog methods by first satisfying Equation 19 and then solving Equation 18 for $r$.

An alternative solution would be to consider triangles PST, PMV and TOM to derive a pair of simultaneous equations of the form:

$$r = \frac{1}{\sin B}[(E_G L_G + E_R L_R \cos B) \cos D + (L_R E_R \sin B) \sin D] \quad (20)$$

$$0 = L_R E_R \sin B \cos D - L_G E_G \sin D - L_R E_R \cos B \sin D \quad (21)$$

Equations 20 and 21 may also be solved by analog computer methods.

The computer 95 illustrated in Fig. 5 is adapted to effect a solution of Equations 18 and 19. To this end, the signals passed by the amplifiers 93 and 94, which, as previously mentioned, have values corresponding to $L_R$ and $L_G$, are applied across potentiometers 97 and 99. The position of the variable tap 97a of potentiometer 97 is adjusted by handcrank 96 in order to multiply the signal $L_G$ by a factor $E_G$ which is a function of the expansion rate of the Green hperbolic lines in the area in which the mobile craft 14 is operating. As previously mentioned, the value of the expansion rate $E_G$ to be set into the computer is determined by reference to the geographical chart upon which the various expansion rates of the hyperbolas of both the Red and Green families in the different areas of operation are appropriately marked. In similar manner, handcrank 98 is employed to alter the position of variable tap 99a in order to multiply the signal $L_R$ by a factor $E_R$ corresponding to the expansion rate of the hyperbolic lines of the Red family in the area. The voltage appearing between the variable tap 97a and ground is applied through an amplifier 101 to develop an output signal for application across parallel connected potentiometers or variable impedances 102 and 103. As indicated by broken line 105, the variable taps 102a and 103a are ganged together with another variable tap 104a of potentiometer 104 so that all three of these variable taps may be jointly controlled by a manually adjustable handwheel or crank 106, thereby to set into the computer 95 variations corresponding to the acute angle of intersection B between the hyperbolic lines of the Red and Green families in the area under investigation. The proper value of B is again determined by reference to the geographical chart which carries appropriate designations of the various intersection angles in the different areas of operation. Since the angle of intersection and the expansion rate of both sets of hyperbolas generally remain constant over an appreciable area, frequent adjustment of the handcranks 96, 98 and 106 will probably be unnecessary and, accordingly, a single adjustment may suffice for a number of relatively short runs.

The slide wire of potentiometer 102 is so wound that movement of variable tap 102a therealong introduces a variation corresponding to the sine of the angle of intersection B with the result that the voltage appearing between tap 102a and ground varies as a function of $L_G E_G \sin B$. The latter voltage is applied through a suitable amplifier 107 to one of the stator windings 108a of a resolving device 108 comprising an important portion of a servo system described more fully hereinafter.

Similarly, the slide wire of potentiometer 103 is so wound that movement of tap 103a therealong introduces a variation corresponding to the cosine of the angle of intersection B and, hence, the voltage appearing between tap 103a and ground varies as a function of $L_G E_G \cos B$. This voltage is applied as a first input signal to a summing amplifier 109, which is also energized by the signal from potentiometer 99 varying as $L_R E_R$ and appearing between tap 99a and ground. The amplifier 109 responds to these two input signals by developing an output signal varying as $(E_R L_R + E_G L_G \cos B)$ for application to a second stator winding 108b of the resolving device 108. The stator windings 108a and 108b are oriented perpendicularly to each other and have common points connected to ground, as indicated at 110.

In addition to the stator windings just discussed, the resolving device 108 comprises a pair of rotor windings 108c and 108d oriented perpendicularly to each other and adapted to be moved in unison within the fields established by the signals applied to the stator windings. The voltage induced in the rotor winding 108c by the combined effect of the fields produced by the two stator windings is, of course, a function of the angular position of this particular rotor winding with respect to the stator windings. Specifically, the voltage induced in the rotor winding 108c from the stator winding 108a varies as a function of the cosine of the angle therebetween, which angle is designated as C in Fig. 5 and, as will be shown hereinafter, is equal to the angle C illustrated in Fig. 2. Similarly, the voltage induced in the rotor winding 108c from stator winding 108b varies as a function of the sine of angle C. The stator and rotor windings are so polarized that the voltage induced from stator winding 108b is subtracted from that induced by stator winding 108a with the result that the signal appearing across rotor winding 108c varies as:

$$[(E_G L_G \sin B) \cos C - (E_R L_R + E_G L_G \cos B) \sin C] \quad (22)$$

The signal developed by rotor winding 108c is applied to a conventional AVC circuit 111 in order to develop a unidirectional control signal having an amplitude which is a function of the magnitude of the difference between the two terms of Expression 22 and having a polarity which is a function of the relative values of these two terms. To provide a voltage of sufficient amplitude to drive motor 113, the signal produced by the AVC circuit 111 is passed through a suitable amplifier 112. The motor 113 is driven in a direction corresponding to the polarity of its energizing voltage in order to turn the rotor windings 108c and 108d in unison until the output signal from the winding 108c is reduced to zero at which time Equation 18 derived above will be satisfied. Obviously, in the absence of an output signal from rotor winding 108c, the motor 113 will cease its rotation and the angle between rotor winding 108c and stator winding 108a will be equal to the angle C expressed in Equation 18 and illustrated in Fig. 2. In effect, the resolving device 108 and its associated circuits comprise a servo system which has for its primary purpose the solution of Equation 18 for the angle C shown in Fig. 2.

With the rotor winding 108c oriented at an angle C with respect to stator winding 108a, the latter will induce a voltage in the rotor winding 108d which varies as a function of sin C and, at the same time, the stator winding 108b will induce a voltage in rotor winding 108d which varies as a function of cos C. The rotor winding 108d and the two stator windings are so polarized that the two signals induced therein will be added together to produce an output signal varying as:

$$(E_G L_G \sin B) \sin C + (E_R L_R + E_G L_G \cos B) \cos C \quad (23)$$

which differs from the range ($r$) expressed by Equation 19 only by the absence of the factor $1/\sin B$. The output signal thus produced is applied through an amplifier 114 to a subtraction amplifier 115.

The output of the subtraction amplifier is employed to energize a motor 118 which, in turn, drives the variable tap 116a of a potentiometer 116 through suitable drive mechanism represented by the broken line 119. The subtraction amplifier 115 is also energized by a signal appearing between the variable tap 104a of potentiometer 104 and ground which, for the time being, shall be assumed to vary as $y \sin B$ wherein $y$ represents the signal appearing between the variable tap 116a of the potentiometer 116 and ground. In this connection, it will be observed that the slide wire of potentiometer 104 is so wound that movement of tap 104a therealong by rotation of handcrank 106 introduces a variation corresponding to sin B. Thus, the output of potentiometer 104 appearing between tap 104a and ground varies as $y \sin B$. The potentiometer 116 is energized by a standard voltage applied to terminal 117 from any suitable source, such as source 89.

From the foregoing discussion, it will be recognized that the subtraction amplifier 115 continuously compares the signal from potentiometer 104 with that from the amplifier 114. If the relative values of these signals are such that the output of the subtraction amplifier is zero then:

$$y \sin B = [(E_G L_G \sin B) \sin C + (E_R L_R + E_G L_G \cos B) \cos C]$$

or:

$$y = \frac{1}{\sin B}[(E_G L_G \sin B \cos C) + (E_R L_R + E_G L_G \cos B) \cos C] \quad (24)$$

Hence, by comparing Equations 18 and 24

$$y = r$$

and a measurement of the voltage appearing between variable tap 116a and ground, as effected by voltage measuring device 120, provides an indication of the range $r$ from the mobile craft 14 to the target point T. The voltage measuring device 120 is, of course, suitably calibrated to read the range directly in terms of distance. In the event that the amplifier 115 develops an output signal, the motor 118 is driven in proper direction to increase or decrease the value of ($y \sin B$) until the latter is equal to the signal from the amplifier 114. Thus, the measuring device 120 continuously indicates the distance between position of the mobile craft 14 and the target point T as the craft moves within the area under investigation.

To provide a continuous indication of the true bearing of the preplot point T from the mobile craft, information concerning the magnitude of the angle E shown in Fig. 2 is supplied to the computer 95. The angle E represents the angle between magnetic north and the hyperbolic lines of one of the families of hyperbolas, as, for example, the Green family shown in Figs. 1 and 2. This angle is derived from the geographical chart which contains appropriate designations of the value of the angle E in the various areas in which the mobile craft is operated. The angle E, which may be of any value between 0° and 360°, is supplied to the computer 95 by a crank or handwheel 121 having a suitable calibrated scale positioned adjacent thereto to facilitate the adjustment. Since the angle E remains constant over an area of substantial size, it is possible that several short runs of the mobile craft between points spaced fairly close together can be made with a single adjustment of the handwheel 121. In any event, the movement of the handwheel 121 is coupled through suitable mechanism, indicated by the broken line 122, to an indicating device 123. The latter indicating device is also connected, as indicated by broken line 124, to be driven by the shaft of motor 113. It will be recalled that the shaft of motor 113 occupies a position corresponding to angle C which, like the angle E may be of any value between 0° and 360°. The indicating device 123 algebraically adds the input angle E and the angle C found by the servo system in order to provide an indication corresponding to $C+E$ which, as will be observed from Fig. 2, represents the true bearing A of the range line $r$ interconnecting the mobile craft and the target point T.

To obtain an indication of the relative bearing of the range line $r$ with respect to the heading of the craft 14, the output of the indicating device 123 appearing upon shaft 125 may be applied to one of the input gears of a mechanical differential 126, the other input gear of which is actuated from a magnetic compass 127 carried by the mobile craft. To this end, the rotary indicating element 127a of the compass is employed to drive a torque amplifier 128 of conventional construction in order to develop an output upon driving shaft 129. As indicated by broken line 130, this shaft may be employed to drive a measuring device 131 for indicating the true heading of the mobile craft 14. In other words, the measuring device 131 indicates the angle F shown in Fig. 3 between the heading of the mobile craft and magnetic north. The mechanical differential responds to the two signals supplied to its input gears by developing a signal corresponding to A—F, which, as is apparent from Fig. 3, represents the relative bearing G of the preplot point T from the position of the mobile craft. In order to provide a continuous measurement of the relative bearing angle G, the output of the differential 126 is employed to drive an indicating device 132.

To facilitate the above description, no mention has been made of the effects of the signs of $L_R$ and $L_G$ upon the operation of the computer 95. Thus, as described above, if the reading of the lane counter 32 must be increased in order to bring it into coincidence with the preplot counter 83 the sign of $L_R$ is positive whereas if the reading of lane counter 32 must be decreased $L_R$ is negative. A similar relationship exists between the sign of $L_G$ and the readings on counters 33 and 84. Moreover, it will be recalled that the phase of the output signals from potentiometers 85 and 90 reverses in accordance with the signs of $L_R$ and $L_G$. Since the servo system and particularly the resolving device 108 is polarity sensitive and is stable in only one position, the range Equation 18 will be properly solved for any combination of signs of $L_R$ and $L_G$ and the indications appearing upon the devices 123 and 132 measuring the true and relative bearings of the range $r$ will be continuous through 360°. Thus, the signs of $L_G$ and $L_R$ will determine the magnitude of angle C to be added to the manually supplied angle E in the indicating device 123 with the result that a measurement of the true bearing angle A will be continuously provided and the output of the indicating device 123 will cooperate with compass 127 to drive the measuring device 132 in order to provide a continuous indication of the relative bearing angle G.

To consider briefly the operation of the apparatus illustrated in Fig. 5, the present or initial position P of the craft is determined by transforming the readings of the phase meters 30 and 31 and the lane counters 32 and 33 into their corresponding hyperbolic coordinates on the geographical chart of the area under investigation. The expansion rates $E_R$ and $E_G$ of the two sets of hyperbolic lines, the angle of intersection B of the hyperbolas and the angle E between one set of hyperbolas and magnetic north for the particular area are all derived from the chart and manually supplied to the computer 95 by rotating the appropriate handcranks in the manner described above. The preplot counters 83 and 84 are next manually adjusted until they correspond to the hyperbolic coordinates of the target point T as derived from the chart. As the craft is moved from the point P, the readings on lane counters 32 and 33 and on the phase meters 30 and 31 will change to induce movement of the variable taps 85$b$ and 90$b$ of the potentiometers 85 and 90. The latter movements control both the amplitudes and signs of $L_R$ and $L_G$ supplied to the computer so that these terms are continuously representative of the number of Red and Green hyperbolic isophase lines that must be traversed by the craft before it arrives at the target point T.

The computer 95 responds to the manually supplied information and to the signals from potentiometers 85 and 90 in the manner previously described by providing a continuous measurement of the range $r$ of the target point from the mobile craft and also by indicating the true bearing A and the relative bearing G of the target point from the craft. When the range $r$ is reduced to zero, the craft has, of course, arrived at its desired destination at the point T. To direct the craft between a succession of target points, the procedure described above may be repeated, although, as previously indicated, if such points are spaced relatively close together, further adjustment of the handcranks 96, 98, 106 and 121 may be unnecessary.

While particular embodiments of the invention have been shown and described, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. Apparatus for use in radio position finding systems to assist in the navigation of a mobile craft to any selected position, which apparatus comprises means for providing a pair of outputs representative of intersecting radio position lines defining the location of the craft manually, settable means for providing a pair of outputs representative of intersecting radio position lines defining the selected future position, and means jointly responsive to all four of said outputs for continuously indicating the progress of said craft as it approaches said future position.

2. Apparatus for use in radio position finding systems of the hyperbolic type in order to assist in the navigation of a mobile craft to any selected future position, which apparatus comprises means for providing a pair of outputs respectively representative of hyperbolic coordinates passing through the location of the craft, manually settable means for providing a pair of signals respectively representative of hyperbolic coordinates passing through said selected future position, and means jointly responsive to all four of said outputs for continuously indicating the progress of said craft as it moves towards said selected future position.

3. Apparatus for use in radio position finding systems to assist in the navigation of a mobile craft from a geographical position defined by a first pair of intersecting radio position coordinates to any desired future position defined by a second pair of intersecting radio position coordinates, which apparatus comprises, means for developing a first signal varying in accordance with the difference between one of the coordinates of the first pair and one of the coordinates of the second pair, means for developing a second signal varying in accordance with the difference between the other coordinate of the first pair and the other coordinate of the second pair, and means jointly responsive to both of said signals for continuously indicating the progress of said craft as it approaches said future position.

4. Apparatus for use in radio position finding systems of the hyperbolic type to assist in the navigation of a mobile craft from a geographical position defined by a first pair of hyperbolic radio position coordinates to any desired future position defined by a second pair of hyperbolic radio position coordinates, which apparatus comprises, means for developing a first signal varying in accordance with the difference between a first of the hyperbolic coordinates defining the craft location and a first of the hyperbolic coordinates defining the future position, means for developing a second signal varying in accordance with the difference between a second of the hyperbolic coordinates defining the location of the craft and a second of the hyperbolic coordinates defining the selected future position, and means jointly responsive to both of said signals for continuously indicating the progress of said craft as it approaches said future position.

5. Apparatus for use in radio position finding systems to assist in the navigation of a mobile craft to any selected future position, which apparatus comprises means for providing a first pair of outputs varying in accordance with the geographical position of the craft, means for providing a second pair of outputs corresponding to the future position of the craft, means jointly responsive to one of the outputs of the first pair and to one of the outputs of the second pair for developing a signal varying in accordance with the difference therebetween, means jointly responsive to the other output of the first pair and to the other output of the second pair for developing a signal varying in accordance with the difference therebetween, and means jointly responsive to both of said signals for continuously indicating the progress of said craft as it approaches said future position.

6. Apparatus for use in radio position finding systems to assist in the navigation of a mobile craft to any selected future position, which apparatus comprises means for providing a first pair of outputs varying in accordance with the geographical position of the craft, settable means for providing a second pair of outputs corresponding to the future position of the craft, means including a first variable impedance for deevloping a first signal corresponding to the difference between one of the outputs of the first pair and one of the outputs of the second pair, means including a second variable impedance for developing a second signal corresponding to the difference between the other output of the first pair and the other output of the second pair, and indicating means jointly responsive to the signals developed across both of said variable impedances for indicating the progress of the mobile craft as it approaches the selected future position.

7. Apparatus for use in radio position finding systems to assist in the navigation of a mobile craft to any selected future position, which apparatus comprises means for providing a first pair of outputs continuously representative of intersecting radio position lines defining the geographical position of the craft, settable means for providing a second pair of outputs representative of intersecting radio position lines defining the future position of the craft, means jointly responsive to one of the outputs of the first pair and to one of the outputs of the second pair for developing a signal varying in accordance with the difference therebetween, means jointly responsive to the other output of the first pair and to the other output of the second pair for developing a signal varying in accordance with the difference therebetween, and means jointly responsive to both of said signals for continuously indicating the progress of said craft as it approaches said future position.

8. Apparatus for use in radio position finding systems of the hyperbolic type to assist in the navigation of a mobile craft to any selected future position, which apparatus comprises means for providing a first pair of outputs representative of hyperbolic radio position coordinates defining the geographical position of the craft, settable means for providing a second pair of outputs representative of hyperbolic radio position coordinates defining the future position of the craft, means jointly responsive to one of the outputs of the first pair and to one of the outputs of the second pair for developing a signal varying in accordance with the difference between a first of the hyperbolic coordinates passing through the craft location and a first of the hyperbolic coordinates passing through the future position, means jointly responsive to the other output of the first pair and to the other output of the second pair for developing a signal varying in accordance with the difference between a second of the hyperbolic coordinates passing through the location of the craft and a second of the hyperbolic coordinates passing through the selected future position, and means jointly responsive to both of said signals for continuously indicating the progress of said craft as it approaches said future position.

9. Apparatus for use in radio position finding systems to assist in the navigation of a mobile craft to any selected future position, which apparatus comprises means for providing a first pair of outputs representative of intersecting radio position lines defining the geographical position of the craft, settable means for providing a second pair of outputs representative of intersecting radio position lines defining the future position of the craft, means including a first variable impedance for developing a signal corresponding to the difference between one of the outputs of the first pair and one of the outputs of the second pair, means including a second variable impedance for developing a signal corresponding to the difference between the other output of the first pair and the other output of the second pair, and indicating means jointly responsive to the signals developed across both of said variable impedances for indicating the progress of said mobile craft as it approaches the selected future position.

10. Apparatus for use in radio position finding systems of the hyperbolic type to assist in the navigation of a mobile craft to any selected future position, which apparatus comprises means for providing a first pair of outputs representative of intersecting hyperbolic radio position coordinates defining the geographical position of the craft, settable means for providing a second pair of outputs representative of intersecting hyperbolic radio position coordinates defining the future position of the craft, means including a first variable impedance for developing a signal corresponding to the difference between one of the hyperbolic coordinates passing through the location of the craft and one of the hyperbolic coordinates passing through said future position, means including a second variable impedance for developing a signal corresponding to the difference between the other hyperbolic coordinate passing through the craft location and the other hyperbolic coordinate of said future position, and indicating means jointly responsive to the signals developed across both of said variable impedances for indicating the progress of mobile craft as it approaches the selected future position.

11. Apparatus for use in radio position finding systems of the hyperbolic type to assist in the navigation of a mobile craft from a geographical position defined by a first pair of hyperbolic radio position coordinates to any desired future position defined by a second pair of hyperbolic radio position coordinates which apparatus comprises, means for continuously developing at least one signal varying in accordance with the progress of said craft as it approaches said future position, and means for altering said signal in order to compensate for variations in expansion rates of said coordinates in the areas in which said craft is navigated.

12. Apparatus for use in radio position finding systems of the hyperbolic type to assist in the navigation of a mobile craft from a geographical position defined by a first pair of hyperbolic radio position coordinates to any desired future position defined by a second pair of hyperbolic radio position coordinates which apparatus comprises, means for continuously developing at least one signal varying in accordance with the progress of said craft as it approaches said future position, and means for altering said signal in order to compensate for variations in the angle of intersection between the hyperbolic coordinates in the areas in which said mobile craft is navigated.

13. Apparatus for use in radio position finding systems of the hyperbolic type to assist in the navigation of a mobile craft from a geographical position defined by a first pair of hyperbolic radio position coordinates to any desired future position defined by a second pair of hyperbolic radio position coordinates which apparatus comprises, means for continuously developing at least one signal varying in accordance with the progress of said craft as it approaches said future position, means for altering said signal in order to compensate for variations in expansion rates of said hyperbolic coordinates in the areas in which said craft is navigated, and means for further altering said signal to compensate for variations in the angle of intersection of said coordinates in said areas.

14. Apparatus for use in radio position finding systems of the hyperbolic type in order to assist in the navigation of a mobile craft to any selected future position, which apparatus comprises means for providing an output varying in accordance with hyperbolic radio position lines defining the position of the craft, settable means for providing an output corresponding to hyperbolic radio position lines defining the selected future position of the craft, and means jointly responsive to both of said outputs for continuously indicating the progress of said craft as it approaches said selected future position, the last named means including means to compensate for varying expansion rate of the hyperbolic radio position lines in the areas in which said craft is operating.

15. Apparatus for use in radio position finding systems of the hyperbolic type in order to assist in the navigation of a mobile craft to any selected future position which apparatus comprises means for providing at least one output varying in accordance with each of the hyperbolic radio position coordinates defining the location of the craft, settable means for providing at least one output corresponding to each of the hyperbolic radio position coordinates defining said selected future position, and means jointly responsive to all of said outputs for continuously indicating the progress of said craft as it moves towards said selected future position, the last mentioned means including means to compensate for variations in the angle of intersection of said hyperbolic coordinates in the areas in which said mobile craft is navigated.

16. Apparatus for use in radio position finding systems of the hyperbolic type in order to assist in the navigation of a mobile craft to any selected future position, which apparatus comprises means for providing at least one output varying in accordance with each of the hyperbolic radio position coordinates defining the location of the craft, settable means for providing at least one output corresponding to each of the hyperbolic radio position coordinates passing through said selected future position, and means jointly responsive to all of said outputs for continuously indicating the progress of said craft as it moves towards said selected future position, the last mentioned means including means to compensate for variations in the angle of intersection of said hyperbolic coordinates in the areas in which said mobile craft is navigated and also including means to compensate for varying expansion rates of the hyperbolic coordinates in said areas.

17. Apparatus for use in radio position finding systems of the hyperbolic type in order to assist in the navigation of a mobile craft to any selected future position, which apparatus comprises means for providing a pair of outputs respectively representative of hyperbolic coordinates passing through the location of the craft, settable means for providing a pair of outputs respectively representative of hyperbolic coordinates passing through said selected future position, and means jointly responsive to all four of said outputs for continuously indicating the range of said future position relative to said craft.

18. Apparatus for use in radio position finding systems to assist in the navigation of a mobile craft to any selected position, which apparatus comprises means for providing a pair of outputs representative of intersecting radio position lines defining the location of the craft, settable means for providing a pair of outputs representative of intersecting radio position lines defining the selected future position, and means jointly responsive to all four of said outputs for continuously indicating the range and bearing of said future position relative to said craft.

19. Apparatus for use in radio position finding systems to assist in the navigation of a mobile craft to any selected position, which apparatus comprises means for providing a pair of outputs representative of intersecting radio position lines defining the location of the craft, settable means for providing a pair of outputs representative of intersecting radio position lines defining the selected future position, and means jointly responsive to all four of said outputs for continuously indicating the distance between said craft and said future position during the movement of said craft towards said future position.

20. The combination set forth in claim 1 wherein the indicating means includes a device for indicating deviation of the craft from a direct course to said future position.

21. The combination set forth in claim 2 wherein the indicating means includes a device for indicating deviation of the craft from a direct course to said future position.

22. The combination set forth in claim 3 wherein the indicating means includes a device for continuously indicating any deviation between the ratio of said first and second signals and a predetermined ratio indicative of that which should be maintained in order to direct the craft to the future position.

23. The combination set forth in claim 6 wherein the indicating means includes a bridge circuit comprising said first and second variable impedances and two other impedances, at least one of which is variable, and a device for continuously comparing the ratio of said first and second impedances with the ratio of said two other impedances in order to indicate deviation of said craft from a predetermined course to said future position.

References Cited in the file of this patent

UNITED STATES PATENTS

| | | |
|---|---|---|
| 2,472,129 | Streeter | June 7, 1949 |
| 2,582,588 | Fennessy et al. | Jan. 15, 1952 |
| 2,613,339 | Palmer | Oct. 7, 1952 |
| 2,698,935 | Sitterly | Jan. 4, 1955 |